Figure 1:
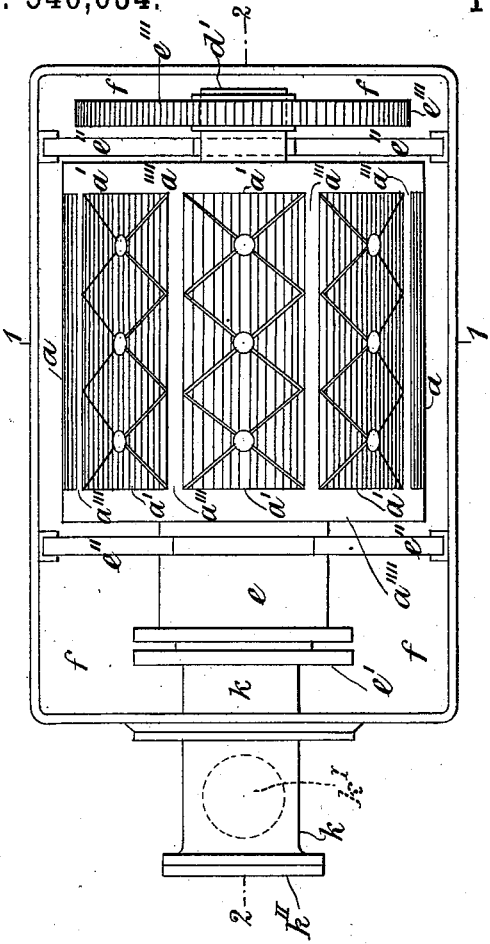

(No Model.) 2 Sheets—Sheet 1.

H. C. ATKINS.
FILTERING MACHINERY.

No. 546,634. Patented Sept. 17, 1895.

Witnesses.
J. C. Wilson
John H. Hall

Inventor.
H. C. Atkins
by Whitman & Wilkinson
Attys.

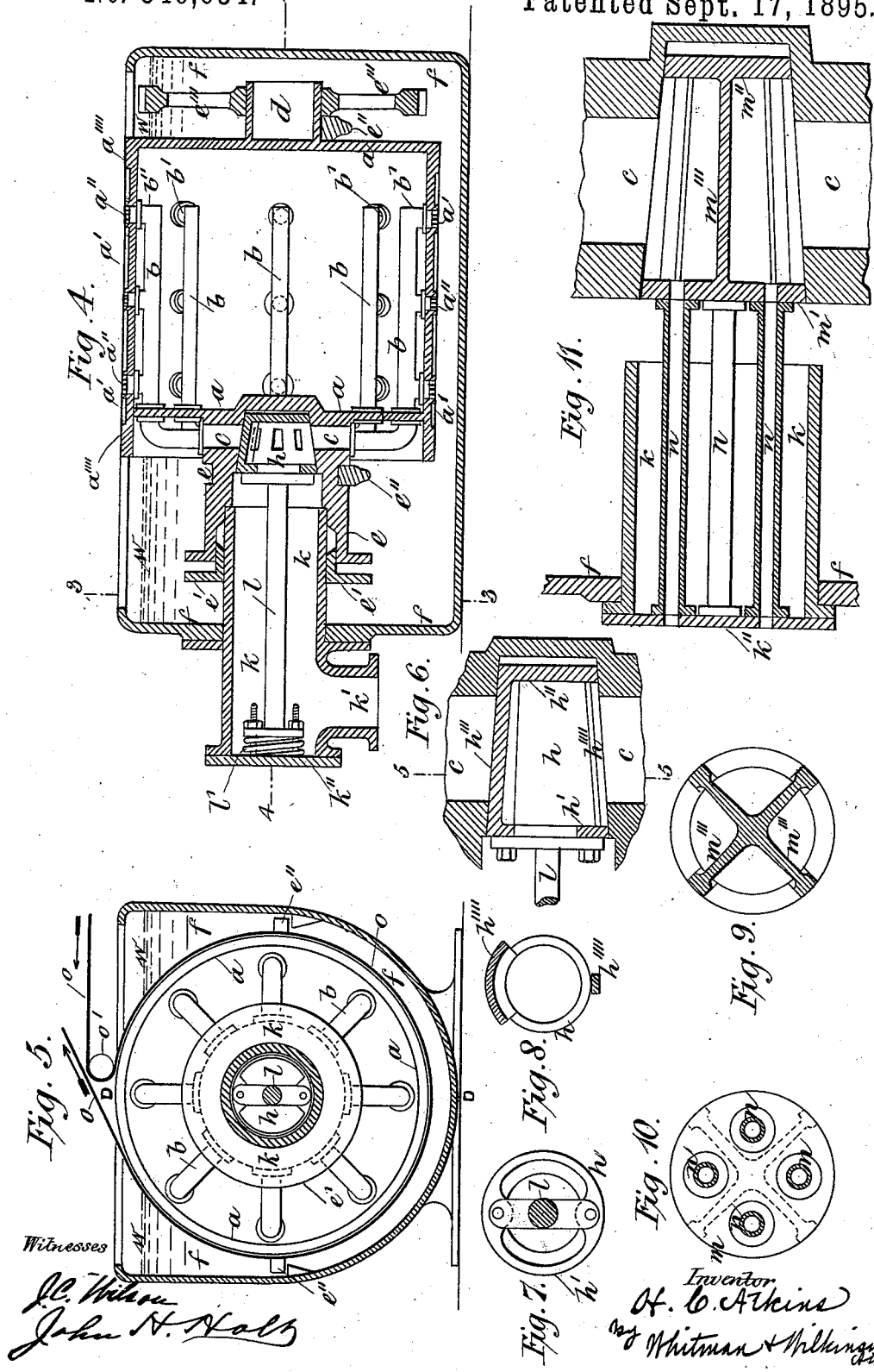

UNITED STATES PATENT OFFICE.

HARRY CHRISTOPHER ATKINS, OF LONDON, ENGLAND.

FILTERING MACHINERY.

SPECIFICATION forming part of Letters Patent No. 546,634, dated September 17, 1895.

Application filed April 23, 1894. Serial No. 508,728. (No model.) Patented in England May 18, 1893, No. 9,952.

*To all whom it may concern:*

Be it known that I, HARRY CHRISTOPHER ATKINS, engineer, a subject of the Queen of Great Britain, residing at 27 Agamemnon Road, West Hampstead, England, have invented Improvements in Filtering Machinery, (for which I have obtained Letters Patent in England, No. 9,952, dated May 18, 1893,) of which the following is a specification.

This invention relates to machinery for the continuous filtration of water in large or small quantities, but primarily has for its object the filtering of large quantities of water, such as town supplies, and may also be used, if desired, for separating the solid matter from sewage-water, manufacturers' refuse, or for the like purposes.

This invention comprises a large tank or vessel into which is fed the water or liquid to be filtered or treated, a large drum or cylinder having a solid periphery and adapted to revolve on its longitudinal axis in said tank and almost but not quite totally immersed in the said water or liquid in said tank, a number of holes or openings through the periphery of said drum, a number of separate collecting areas arranged on the exterior of the drum by having a series of channels or grooves (either longitudinal, diagonal, radial, or otherwise) formed on the outside of said drum and specially arranged with reference to said holes or openings, and which serve to collect the water or liquid as same comes through the filtering medium and conduct it readily and quickly to said holes or openings, pipes or passages inside the drum leading from each said hole or opening or from several of same to a collecting-box bearing or hollow axle of the drum, a spring-mounted non-rotating hollow plug or valve around which the said collecting-box of the drum revolves, a longitudinal division or divisions in said hollow plug, means to shut off connection or close one (or more) such collecting-pipe (or pipes) when same is (or are) in the uppermost position— *i. e.*, when the hole or holes to which it leads in the periphery is out of water or nearly so— a circular stationary chamber or pipe inclosing said valve-spindle at one end to receive the filtered liquid from said collecting-box and at its other passing through the end of the tank and terminating in a discharge-pipe outside the tank, and around this said chamber or pipe inside the tank a stuffing-box carried on said closed drum revolves with the latter, an endless band of cloth or other suitable filtering material adapted to pass around the exterior of the said drum and thence through a suitable adjacent washing apparatus and back to the drum, and various other details of improvement, all of which will be fully described hereinafter, and finally pointed out in the claims.

Figure 2:
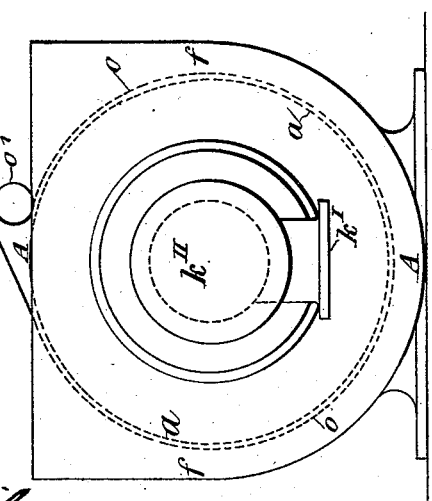
Figure 3:
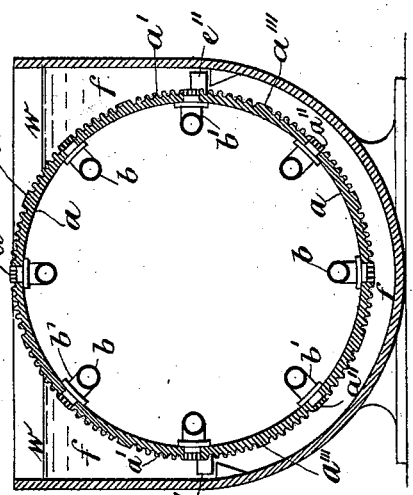

In the accompanying drawings, Figure 1 is an end elevation and Fig. 2 a plan of my improved machinery. Fig. 3 is a cross-section of the apparatus on line 1 1, Fig. 2, looking in the direction of the arrow $z$. Fig. 4 is a longitudinal vertical section on line 2 2, Fig. 2. Fig. 5 is a view on line 3 3, Fig. 4, looking in the direction of the arrow $y$, showing the several collecting-pipes coming through the end of the drum and converging toward and terminating in the collecting-box, but omitting the bearing-bar $e''$. Fig. 6 is a "local view," on an enlarged scale, (*i. e.*, longitudinal section,) on line 4 4, Fig. 4, showing the special construction of the valve. Fig. 7 is an end view of Fig. 6. Fig. 8 is a cross-sectional view on line 5 5, Fig. 6. Fig. 9 is a cross-sectional view, Fig. 10 an end view, and Fig. 11 a longitudinal sectional view, all on an enlarged scale, of a modified construction of valve.

Similar letters of reference indicate corresponding parts throughout.

Figs. 1 to 8 illustrate a filtering-machine, having on the solid rim or periphery of the drum or cylinder $a$ a number of longitudinal and diagonal collecting-channels $a'$, the said periphery of the drum $a$ being divided into a number of longitudinal collecting areas, each of these areas being arranged to act as or subdivided into several "local" collecting areas, each of these latter being provided with a local hole or opening $a''$, through the periphery into the interior of the drum $a$, each such hole being fitted with a branch pipe $b'$, leading into one of the collecting-pipes $b$, connected to and discharging into the collecting-box $c$, the interior of which latter is of conical or tapering form and fitted with a hollow valve or skeleton plug $h$ of similar form, which latter is spring-mounted, as hereinafter explained.

The solid rim or periphery of the drum or cylinder $a$ is plain for a short distance near each end $a''''$, but the intervening surface is provided and covered with ribs or grooves and channels $a'\ a'$, so arranged as to divide the surface into any desired number of collecting areas, as before described, presenting a channeled or furrowed surface for the endless band of filtering material to rest upon, so that the filtered liquid can travel underneath it to the openings or outlets $a''\ a''$, which latter are advantageously provided with a grid to prevent the filtering-cloth being drawn in.

Each longitudinal collecting area is separated from the next by a plain space or rib $a'''\ a'''$, extending longitudinally from one plain end of the periphery to the other.

The collecting-pipes $b\ b$ are arranged inside the cylinder, there being one pipe for each longitudinal collecting area and a branch $b'\ b'$, attached to each said opening or outlet $a''\ a''$. One end of the pipe is closed, but the other discharges into the collecting-box $c\ c$, formed at or near the end of the cylinder $a$. The interior of this collecting-box $c$ is of conical or tapering form internally, as shown in Fig. 4, for the purpose of receiving a hollow valve or skeleton plug $h$ of corresponding tapering form and intended to fit therein. This plug is shown in position in Fig. 4, and more fully in detail in Figs. 6, 7, and 8. The front end consists of a ring $h'$, fitting the large end of the inside of the said hollow bearing. The small end $h''$ is a disk or it may be a ring also. The two ends are joined by a circular-shaped roof-piece or septum $h'''$, which fits against the top of the said bearing, and is fully shown in Figs. 6 and 8. This top piece or septum $h'''$ serves to close one or more openings or terminals of the pipes $b$ in the collecting-box $c$ as same arrive at or near the topmost position, so that a vacuum can be maintained throughout the collecting-pipes and collecting areas, which are below the surface of the liquid, and thus each part of the periphery is cut off when same comes to the topmost position as the drum revolves. A rib $h''''$ connects and strengthens the two ends. This skeleton plug $h$ does not revolve, and is held in position by being secured to one end of the rod $l$. The opposite end of the rod $l$ has a collar thereon (which latter fits over two studs on the end cover $k''$) and the spring $l'$. This latter, through the rod $l$, presses the plug $h$ against the interior of the collecting-box $c$, and, as it is commonly expressed, "keeps it up to its work."

Figs. 1 and 5 show a portion of the endless band of filtering material $o\ o$, nearly surrounding the cylinder $a\ a$. When at work filtering, the cylinder $a$ is intended to revolve slowly. The cylinder is caused to revolve by motion being imparted to the spur-wheel $e'''$, mounted on the back axle $d$ of the drum $a$. The drum is carried by the said back axle or trunnions $d$ and the front hollow trunnions $e$, resting on bearings or bearing-bars $e''\ e''$, on which latter the said drum revolves. $e'$ is a gland or packing by which the said hollow trunnion $e$ is fitted onto the discharge-pipe $k$, on the exterior of which it is thus adapted to revolve. $k'$ is the outlet from the discharge pipe $k$, whence the filtered water is led away in any desired manner. The usual water-level is shown at $w\ w$. The filtering material $o\ o$ is led onto the cylinder $a$ by the roll $o'$, travels with it as it revolves, and is led off on approaching the top, as shown by the arrows.

Figs. 9, 10, and 11 show the construction of the plug when it is desired to separate the filtered liquid discharged into the collecting-box $c$ as the cylinder revolves, and thereby obtain separate qualities of filtration. The plug $m$ is of conical or tapering form to fit the interior of the collecting-box $c$, as before. The large end $m'$ and small end $m''$ are solid disks joined together by the longitudinal divisions $m'''$, the number of which is governed by the number of compartments it is desired to form. In Fig. 9 four compartments are shown with a separate pipe $n$ connected to each, as shown in Figs. 10 and 11. The four pipes pass along the main discharge-pipe $k$ and terminate at the end cover $k''$ or in other convenient manner, and may be spring-mounted, if desired, in which case each pipe $n$ would pass through a stuffing-box in the end cover $k''$, and thus the valve would be automatically kept up to its work, as before, or same may be otherwise suitably adjusted. The top compartment may be open, as shown, or closed over by means of a piece, like the septum $h'''$ in Figs. 6 and 8, in which latter case its corresponding pipe $n$ would be dispensed with.

The operation is as follows: The liquid to be filtered is fed into the cistern $f\ f$ in any suitable manner and filters through the material $o$ while the latter is traveling, leaving the impurity or deposit on the outside of the material. The material conveys such impurities deposited thereon out of the cistern to any convenient receptacle or cleaning apparatus. The filtered liquid passes along the grooves on the outside surface of the cylinder to the openings $a''\ a''$, then into the pipes $b\ b$, is conveyed by these to the hollow bearing $c$, and thence through the skeleton plug $h$ into the main discharge-pipe $k$, Figs. 1, 2, and 4, and is delivered outside the cistern $f$. The branch $k'$ may be extended, so as to give the filtered liquid a certain fall, or the suction-pipe of a pump is connected. By either means any desired vacuum can be obtained, and not only is filtration facilitated in several ways, but some liquids of a very clogging nature can be filtered, which without the aid of the vacuum is difficult if not impossible.

Having thus described my invention, what I claim as new, and desire to secure by Letters Patent of the United States, is—

1. In filtering machinery the combination with a tank containing the liquid to be filtered, of a drum or cylinder in said tank adapted to be slowly revolved while partially immersed in said liquid therein, an endless band of filtering material passing around said drum, a number of holes or openings through the periphery of said drum, a series of grooves or channels arranged on the exterior of said drum and acting as separate collecting areas each such area being adapted to collect and conduct the liquid to the aforesaid openings, collecting pipes or passages connected on the inside of the drum to said openings and leading to the collecting box of the drum, and a discharge pipe leading from the said collecting box, substantially in the manner and for the purposes hereinbefore set forth.

2. In filtering machinery the combination with a tank containing the liquid to be filtered of a drum or cylinder in said tank adapted to be slowly revolved while partially immersed in said liquid therein, an endless band of filtering material passing around said drum, a number of holes or openings through the periphery of said drum, a series of grooves or channels arranged on the exterior of said drum and acting as separate collecting areas each such area being adapted to collect and conduct the liquid to the aforesaid openings, collecting pipes or passages connected on the inside of the drum to said openings and leading to the collecting box of the drum, a spring-mounted tapering (conical) stationary hollow plug adapted to fit in said collecting box and around which the said drum revolves, and a discharge pipe leading from the said collecting box substantially in the manner and for the purposes hereinbefore set forth.

3. In filtering machinery the combination with a tank containing the liquid to be filtered, of a drum or cylinder in said tank adapted to be slowly revolved while partially immersed in said liquid therein, an endless band of filtering material passing around said drum, a number of holes or openings through the periphery of said drum, a series of grooves or channels arranged on the exterior of said drum and acting as separate collecting areas each such area being adapted to collect and conduct the liquid to the aforesaid openings, collecting pipes or passages connected on the inside of the drum to said openings and leading to the collecting box of the drum, a spring-mounted tapering (conical) stationary hollow plug adapted to fit in said collecting box and around which the said drum revolves, a longitudinal division or divisions in said plug forming separate compartments therein, a separate discharge pipe leading from each such compartment to a separate outlet so as to give qualities of filtration substantially in the manner and for the purposes hereinbefore set forth.

4. In filtering or the like machinery, the combination with a revolving drum and an endless band of filtering material operating around same, of a hollow collecting box of conical form internally carried on one end of said drum and into which the filtered water is conveyed, and a spring-mounted hollow valve or skeleton plug of corresponding conical form to the inside of the said collecting box with which it is adapted to fit closely and be there held up to its work substantially in the manner and for the purposes hereinbefore set forth.

5. In filtering or the like machinery, the combination with a revolving drum and an endless band of filtering material operating around same, of a number of separate collecting areas formed on the exterior of said drum as described, an opening through the periphery of the drum for each such area, a pipe connecting each such opening to a collecting box on the drum of a conical form internally, and a spring-mounted hollow valve or skeleton plug of corresponding conical form adapted to fit inside said collecting box and be there held up to its work by its spring, substantially in the manner and for the purposes hereinbefore described.

HARRY CHRISTOPHER ATKINS.

Witnesses:
F. M. ATKINS,
WALTER GEO. ATKINS.